United States Patent [19]

Kumada

[11] Patent Number: 5,038,609
[45] Date of Patent: Aug. 13, 1991

[54] THERMAL TYPE FLOW DETECTING APPARATUS

[75] Inventor: Akira Kumada, Kyoto, Japan

[73] Assignee: Murata Mfg., Co., Ltd., Japan

[21] Appl. No.: 545,095

[22] Filed: Jun. 27, 1990

Related U.S. Application Data

[63] Continuation of Ser. No. 406,868, Sep. 12, 1989, abandoned, which is a continuation-in-part of Ser. No. 253,753, Oct. 5, 1988, abandoned.

[30] Foreign Application Priority Data

Oct. 5, 1987 [JP] Japan .................. 62-251350

[51] Int. Cl.$^5$ .............................................. G01F 1/68
[52] U.S. Cl. .................................................. 73/204.24
[58] Field of Search ........... 73/204.23, 204.24, 204.25, 73/204.26

[56] References Cited

U.S. PATENT DOCUMENTS

| | | | |
|---|---|---|---|
| 4,306,453 | 12/1981 | Wolfshorndl | 73/204.25 X |
| 4,373,386 | 2/1983 | Schuddemat et al. | 73/204.24 X |
| 4,561,303 | 12/1985 | McCarthy | 73/204.21 |
| 4,576,050 | 3/1986 | Lambert . | |
| 4,637,253 | 1/1987 | Sekimura et al. . | |
| 4,817,427 | 4/1989 | Kitano et al. . | |

FOREIGN PATENT DOCUMENTS

| | | |
|---|---|---|
| 2423302 | 5/1974 | Fed. Rep. of Germany . |
| 3518409 | 11/1985 | Fed. Rep. of Germany . |
| 2046922 | 11/1980 | United Kingdom . |
| 2053491 | 2/1981 | United Kingdom . |

Primary Examiner—Herbert Goldstein
Attorney, Agent, or Firm—Ostrolenk, Faber, Gerb & Soffen

[57] ABSTRACT

A thermal type flow detecting apparatus comprises a thermoelectric detecting element (5) having a base material (1) of a ceramics semiconductor and detecting electrodes (2, 3) respectively arranged in the vicinity of both longitudinal ends on one major surface of the base material, thereby constituting a thermoelectric element, and heating electrodes (4) formed to be opposed to each other with the base material interposed therebetween on both surfaces of the base material in a central portion between both the detecting electrodes.

12 Claims, 4 Drawing Sheets

THERMAL TYPE FLOW DETECTING APPARATUS

This is a continuation of Application Ser. No. 07/406,868, filed on Sept. 12, 1989, now abandoned, by Akira KUMADA entitled "THERMAL TYPE FLOW DETECTING APPARATUS", which is a continuation-in-part of application Ser. No. 07/253,753 filed on Oct. 5, 1988, by Akira KUMADA entitled "THERMAL TYPE FLOW DETECTING APPARATUS", now abandoned.

BACKGROUND OF THE INVENTION

1. Field of the Invention

The present invention relates generally to a thermal type flow detecting apparatus, and more particularly, to an improvement of a thermal type flow detecting apparatus for detecting the flow of a liquid or a gas by utilizing thermoelectromotive forces.

2. Description of the Prior Art

Conventionally known thermal type flow detecting apparatus are roughly divided into two types. A first type thereof detects the flow by heating a detecting portion of, for example, a platinum resistor, arranging the detecting portion in a fluid and measuring the change in electric resistance or current consumption of the detecting portion which appears by the cooling action of the fluid. The second type thereof detects the flow by arranging a heater separately from the detecting portion and measuring the change in electrical characteristics of the detecting portion caused by heat transfer by the fluid which occurs between the heater and the detecting portion. The change in electrical characteristics utilized in the second type comprises the change in resistance value, the change in thermoelectromotive force, the change in pyroelectric current.

In the thermal type flow detecting apparatus of the first type, i.e., a self-heating type, a detecting portion itself of a platinum register is heated. Thus, the life of an element is short. In addition, in order to improve sensitivity, the detecting portion, i.e., a heat generating portion must be made small. However, in such a case, the mechanical strength is decreased. Thus, the flow detecting apparatus of the first type can not be employed in an environment in which mechanical impact is liable to be given or an environment in which a fluid flows at high speed without reducing a sensitivity. Furthermore, since a noble metal such as platinum is used, the cost thereof is high.

On the other hand, in the thermal type flow detecting apparatus of the second type, a resistive heating body is frequently employed as a heater. In addition, as a detecting portion, a thermistor and a metallic resistor are employed or a thermoelectric couple is employed. However, it is difficult to miniaturize the detecting portion in order to improve sensitivity and increase the response speed. More specifically, in the flow detecting apparatus employing the resistive heating body as the heater, the resistor can be miniaturized and made thinner by thin-film techniques or the like. However, in the flow detecting apparatus employing the thermistor or the metallic resistor as the detecting portion, the number of manufacturing processes is increased by miniaturization, and the structure of an element and a signal processing circuit becomes complicated if the resistance value is increased, so that the cost thereof is liable to be high.

Additionally, the thermal type flow detecting apparatus employing the thermoelectric couple as the detecting portion, electromotive forces of the metal thermoelectric couple are small, so that detecting sensitivity can not be so increased.

SUMMARY OF THE INVENTION

An object of the present invention is to provide a small-sized thermal type flow detecting apparatus having high sensitivity.

Briefly stated, the present invention is directed to a thermal type flow detecting apparatus comprising a thermoelectric detecting element having a base material of a ceramics semiconductor and at least one pair of detecting electrodes formed, spaced apart from each other, on the base material, thereby constituting at least one thermoelectric element, and heating means for partially heating a portion between the paired heating electrodes on the base material.

In accordance with another aspect of the present invention, the heating means is structured by using heating electrodes formed to be opposed to each other with the base material interposed therebetween in a portion between the paired electrodes formed on the base material in order to self-heat the above described base material.

In accordance with still another aspect of the present invention, the heating means is structured by a heat generating resistor fixed to the base material.

According to the present invention, since the portion between the paired detecting electrodes formed, spaced apart from each other, on the base material of the ceramics semiconductor is partially heated by the heating means, the amounts of heat from the heating means conducted to both the detecting electrodes through the ceramics semiconductor differ from each other in a case in which a fluid does not flow and a case in which a fluid flows. Thus, if and when the fluid is allowed to flow in an opposing direction of both the detecting electrodes, a temperature difference appears between both the detecting electrodes, so that the flow rate can be detected utilizing the temperature difference. Since the thermal type flow detecting apparatus is structured by only providing at least one pair of detecting electrodes and heating means on a base material of a ceramics semiconductor, miniaturization is easy, so that the sensitivity and the response speed can be easily improved. In addition, the cost thereof is not high, unlike the apparatus using a platinum resistor. Furthermore, if a plurality of pairs of detecting electrodes are structured to be connected to each other in series, a thermal type flow detecting apparatus having higher sensitivity can be easily obtained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a perspective view showing a further embodiment of the invention;

FIG. 8A is a diagram showing a temperature gradient when a fluid does not flow in an ideal embodiment of FIG. 7;

FIG. 8B is a diagram showing a temperature gradient when a fluid does not flow in the embodiment of FIG. 7 in a non-ideal case when the heating electrodes 4 are offset from the center of base member 1;

FIG. 8C shows a potential gradient when no fluid flows in the embodiment of FIG. 7 for a non-ideal case in which heating electrodes 4 are offset from the center of base member 1;

FIG. 8D is a diagram showing potential gradients for the embodiment of FIG. 7 in a non-ideal case in which the heating electrodes 4 are offset from the center of base member 1 prior to an offset voltage from supply 16 being applied (dashed-line curve) and after the application of such voltage (solid-line curve);

FIG. 9 is a perspective view showing a still further embodiment of the present invention;

FIG. 10 is an expanded side view of an embodiment of FIG. 9;

FIG. 11 illustrates yet a further embodiment of the present invention;

FIG. 12A is a perspective view of an upper portion of a yet further embodiment of the invention; and FIG. 12B is a perspective view of the underside of the embodiment of FIG. 12A.

DESCRIPTION OF THE PREFERRED EMBODIMENT

Figure 1:
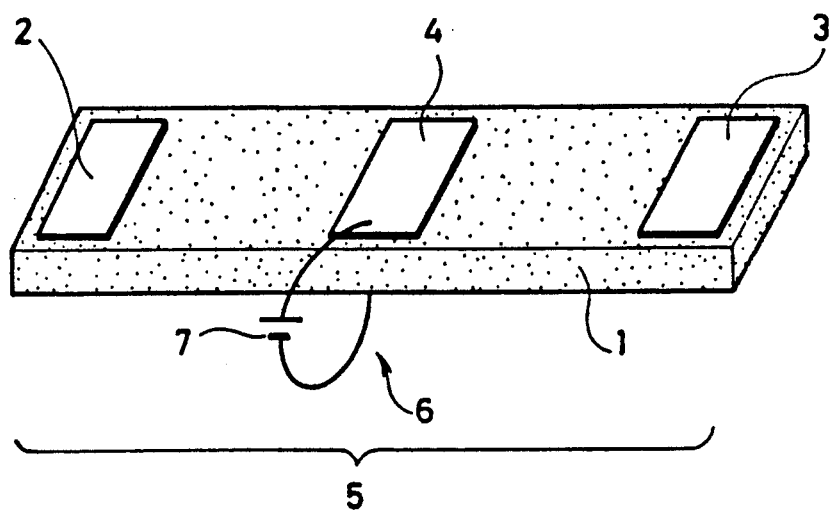
FIG. 1 is a perspective view showing one embodiment of the present invention.

FIG. 1 is a perspective view showing a thermal type flow detecting apparatus according to one embodiment of the present invention. Detecting electrodes 2 and 3 are formed, spaced apart from each other by a predetermined distance, on one major surface of a base material 1 of a ceramics semiconductor structured by using, for example, a semiconductor containing barium titanate. In order to increase a distance between the detecting electrodes 2 and 3 and heating electrodes 4 as described below thereby to improve sensitivity, both the detecting electrodes 2 and 3 are arranged in the vicinity of both longitudinal ends on the major surface of the base material 1. In addition, the heating electrodes 4 are formed to be opposed to each other with the base material 1 interposed therebetween on both surfaces of the base material 1. The heating electrodes 4 are provided for self-heating the base material 1.

It is preferable that the above described detecting electrodes 2 and 3 and the heating electrodes 4 are formed of materials for making ohmic contact with the base material 1 of the semiconductor ceramics, which can be formed by evaporating for example, nickel (Ni). Preferably, silver (Ag) is further evaporated on the Ni layer for reinforcement, so that the strength of each of the electrodes can be increased.

The base material 1 of the ceramics semiconductor exhibits characteristics as a positive characteristic thermistor. Thus, if and when a current is supplied to the heating electrodes 4 formed in the central portion from a power supply 7 included in the heating means 6, the temperature of a portion where the heating electrodes 4 are formed is stabilized at a constant temperature. For example, in the base material 1 formed of the above described barium titanate and having a size of $2 \times 10 \times 0.5$ mm, if the heating electrodes 4 having a size of $2 \times 1$ mm are formed, the temperature of the portion where the heating electrodes 4 are formed is stabilized at a temperature of approximately 120° C.

Figure 2A:
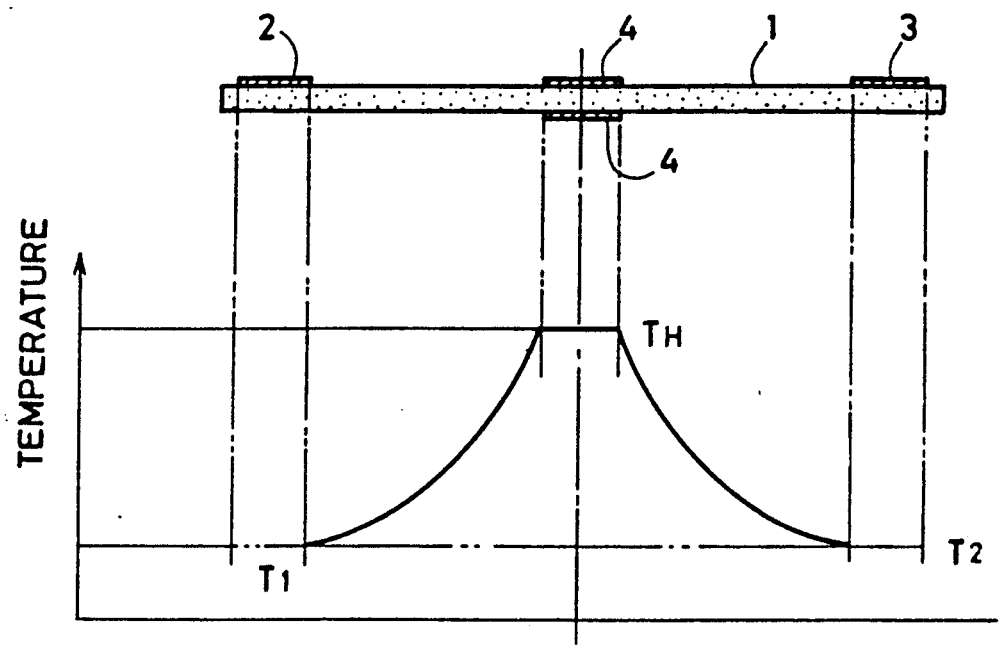
FIG. 2A is a diagram showing a temperature gradient when a fluid does not flow in the embodiment shown in FIG. 1.

Description is now made of an operation of the embodiment shown in FIG. 1. FIG. 2A shows the temperature distribution in the flow detecting apparatus in a state in which a fluid does not flow. In FIG. 2A, $T_H$ denotes the temperature of each of the heating electrodes 4, and T1 and T2 denote the temperatures of the detecting electrodes 2 and 3, respectively. Since the fluid does not flow, respective heat transfers to the detecting electrodes 2 and 3 become equal, so that a temperature gradient symmetrical with respect to the electrodes 4 appears in the base material 1. In this case, a temperature difference does not appear between the detecting electrodes 2 and 3. Thus, an output of a thermoelectromotive force is not produced.

Figure 2B:
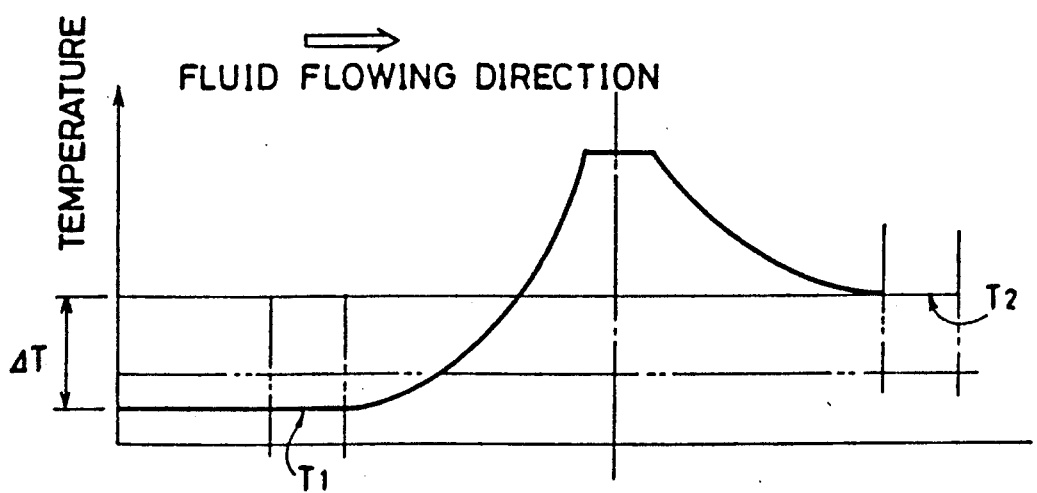
FIG. 2B is a diagram showing a temperature gradient when a fluid flows in the embodiment shown in FIG. 1.
Figure 3:
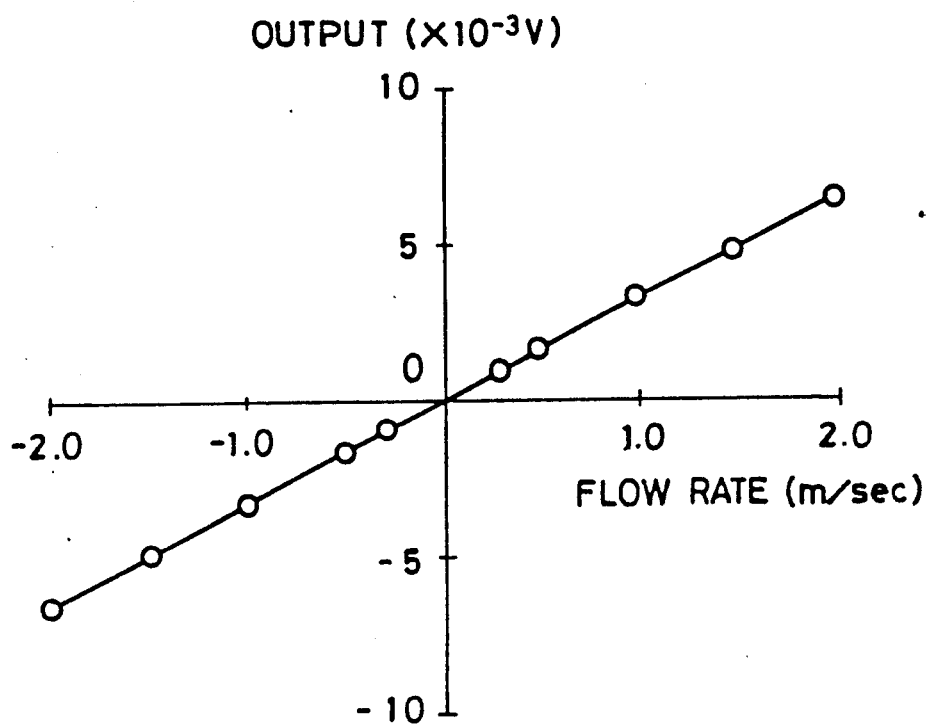
FIG. 3 is a graph showing the relation between an output of a thermoelectromotive force and the flow rate in the embodiment shown in FIG. 1.

On the other hand, if the fluid flows in an opposing direction of both the detecting electrodes 2 and 3, the temperature gradients differ from each other on the side of the upstream and the downstream of the heating electrodes 4 due to the effect of heat transfer caused by the fluid, as shown in FIG. 2B. Thus, a temperature difference $\Delta T$ appears between the detecting electrodes 2 and 3, so that a thermoelectromotive force is produced due to the temperature difference. The flow rate of the fluid can be detected based on the thermoelectromotive force produced due to the temperature difference between both the detecting electrodes. More specifically, as shown in FIG. 3, an output of the thermoelectromotive force based on the temperature difference between both the detecting electrodes correlates to the flow rate. In particular in an area of a low flow rate, the output exhibits approximately linear output characteristics. FIG. 3 shows characteristics in a case in which the fluid comprises air at a temperature of 25° C.

Figure 4:
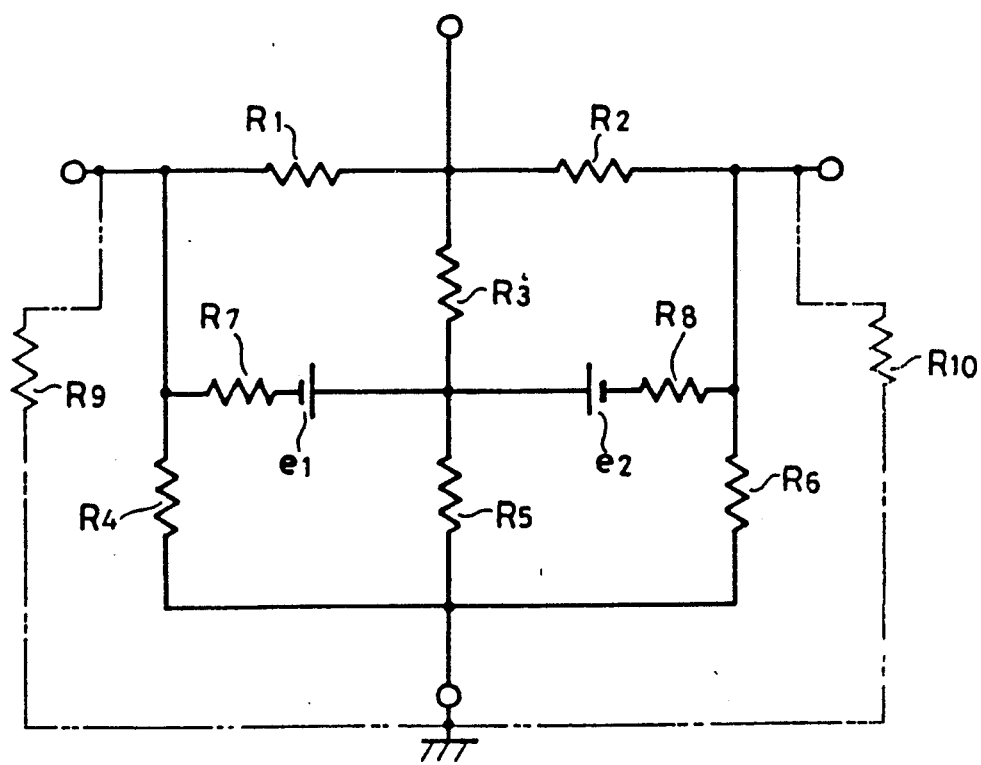
FIG. 4 is a diagram showing an equivalent circuit in the embodiment shown in FIG. 1.

Meanwhile, in the embodiment shown in FIG. 1, the detecting electrodes 2 and 3 and the heating electrodes 4 are formed on a single base material 1. Thus, if the detecting electrodes 2 and 3 are not formed in exactly equivalent positions and the uniformity of the base material 1 is not sufficient, an offset voltage is generated between both the detecting electrodes 2 and 3. The reason for this is that thermal and electrical balances are not identical between both the detecting electrodes. More specifically, in FIG. 4 showing an equivalent circuit of the embodiment shown in FIG. 1, resistors $R_1$ to $R_8$ are determined by the position of each of the electrodes on the base material 1, and thermoelectromotive forces e1 and e2 are determined by the thermal balance between both the detecting electrodes.

Figure 5:
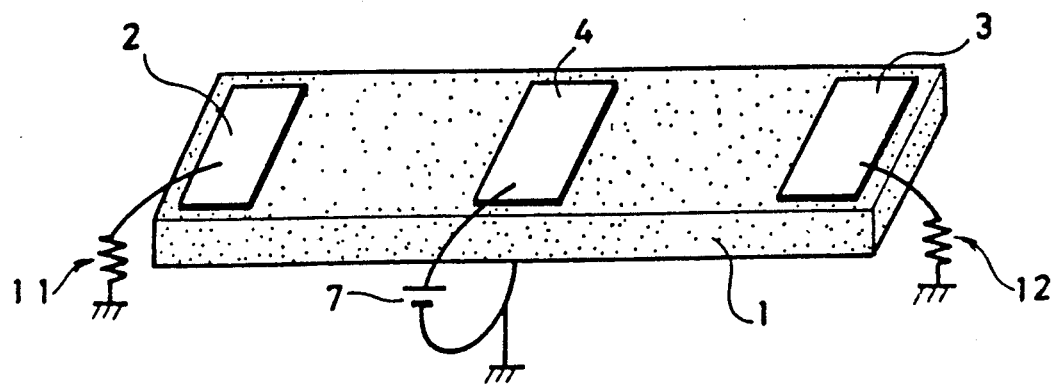
FIG. 5 is a perspective view showing a second embodiment of the present invention.

Thus, in order to decrease the above described offset voltage between both the detecting electrodes, the thermal and electrical balances between both the detecting electrodes must be adjusted. FIG. 5 shows an embodiment in which means for decreasing such an offset voltage is used. Resistor members 11 and 12 are connected between the detecting electrodes 2 and 3 and a reference voltage, respectively. Resistors $R_9$ and $R_{10}$ are inserted into a position represented by a two-dot chain line in FIG. 3. The resistance values of the resistor members 11 and 12 are adjusted, so that outputs of both the detecting electrodes 2 and 3 can be equal to the reference voltage. Preferably, if variable resistor elements are used as resistor members, both the detecting electrodes can be easily balanced. The resistor members may be applied to only either one of the detecting electrodes 2 and 3.

Figure 6:
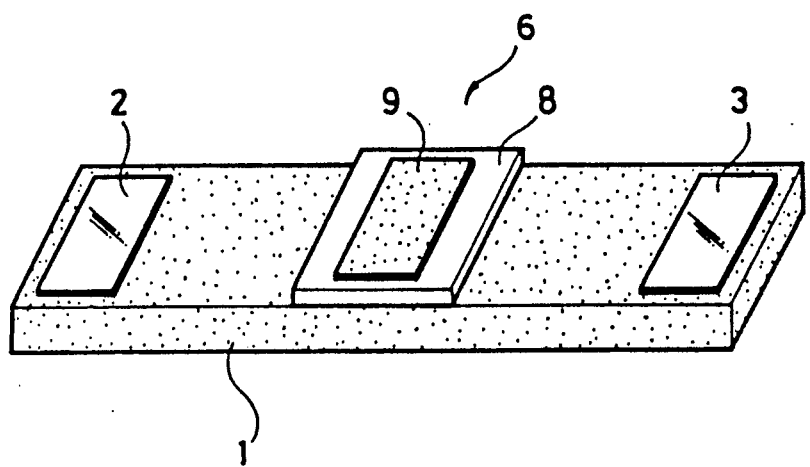
FIG. 6 is a perspective view showing a third embodiment of the present invention.

Instead of providing opposing heating electrodes 4 shown in FIG. 1, a heater of the thick-film resistor type may be formed on the main surface of the base member 1 and be comprised of a ceramic semiconductor with an insulating layer 8 interposed therebetween, as shown in FIG. 6.

Although in the above described embodiment, a thermoelectric detecting element 5 is structured by using a thermoelectric element of a single ceramics semiconductor, a stacked type thermoelectric detecting element may be used in which a plurality of thermoelectric elements are stacked. In this case, if the thermoelectric elements may be connected in series, a larger output of a thermoelectromotive force can be obtained. Thus, a thermal type flow detecting apparatus having higher sensitivity can be obtained. In this case, in a stacked type thermoelectric detecting element in which insulating layers are interposed between sheets of semiconductor ceramics, the above described heating electrodes 4 can not be formed. Therefore, it is necessary to form a heater 9 of, for example, a thick film resistor on one major surface of a base material 1 of stacked type ceramics semiconductor with an insulating film 8 interposed therebetween.

Referring specifically to the stacked type thermoelectric detecting arrangement of FIG. 9, base member 1 comprises the stacked plate-shaped ceramic semiconductor sheets $a_1, a_2 \ldots a_n$. As shown in FIG. 10, each of the ceramic semiconductor sheets is covered by an insulating film 18 except one end portion 17 thereof, and such sheet is electrically connected to an adjacent ceramic semiconductor sheet at the end portion 17. The ceramic semiconductor sheets shown in FIG. 10 are connected in series. The detecting electrodes 2 and 3 are provided on the opposing surfaces of the base member 1; that is, the first and the last ceramic semiconductor sheets. Consequently, the sensitivity in detecting flow rate can be improved.

The thick film resistance 9 is provided on the first or the last ceramic semiconductor sheets. A current is supplied from a power supply 7 to the thick film resistance 9.

FIG. 11 shows a further stacked type thermoelectric detecting arrangement in which base material 1 comprises strip-like ceramic semiconductor sheets $b_1, b_2 \ldots b_n$ stacked one atop another. The ceramic semiconductor sheets $b_1, b_2 \ldots b_n$ shown in FIG. 11 are also connected in series as in the case of FIG. 9. The thick film resistance 9 is provided bridging the respective ceramic semiconductor sheets.

The above described offset voltage between both the detecting electrodes can be also descreased by replacing a direct current voltage with a pulse voltage as a voltage applied to the heating electrodes 4, the heater 9 or the like.

Although in the embodiment shown in FIG. 1 a pair of detecting electrodes 2 and 3 are formed on a single base material, to constitute a single thermoelectric element 5, a plurality of pairs of detecting electrodes may be formed, to constitute a plurality of thermoelectric elements. In such a case, the plurality of thermoelectric elements are connected in series, so that a larger output of a thermoelectromotive force can be obtained; and, thus, a thermal type flow detecting apparatus having higher sensitivity can be obtained.

FIG. 12A, for example, shows a top view of a thermal-type flow-detecting apparatus comprising a plurality of pairs of detecting electrodes, and FIG. 12B shows a bottom view of the apparatus. In the therma-type flow-detecting apparatus, the thick film resistor 9 is provided on one surface of the base material 1 with an insulating film 8 interposed therebetween, and a plurality of pairs of detecting electrodes 21 to 24 and 31 to 34 are provided on the opposing surface. Referring to FIG. 12B, the electrodes 21 and 31 form a pair, the electrodes 22 and 32 form a pair, the electrodes 23 and 33 form a pair and the electrodes 24 and 34 form a pair. Each pair of electrodes and the base material 1 constitute one thermoelectric element. The thermoelectric elements are connected to each other in series by means of interconnection layers 41, 42 and 43 formed of the same material as the electrodes. The detected outputs are provided from the electrodes 21 and 34 at the ends.

Furthermore, the shape of a base material of a ceramics semiconductor need not be necessarily of a flat plate type as shown. The base material can be formed in an arbitrary shape such as a cylindrical shape.

Additionally, both the detecting electrodes need not be formed in positions thermally equivalent to a heating portion. More specifically, in a state in which a fluid does not flow, there may be a difference in temperature between both the detecting electrodes. The reason for this is the following. Even in such a case, if and when the fluid flows in an opposing direction of both the detecting electrodes, a temperature gradient different from that in an initial state appears in the base material, so that the temperature difference between both the detecting electrodes is changed depending on the flow rate of the fluid.

Although in the above described embodiment, semiconducting barium titanate is used as a ceramics semiconductor, it should be noted that the ceramics semiconductor is not limited to the same. Another n type semiconductor which can be selected comprises, for example, $TiO_2$, $V_2O_5$, $MoO_2$, $PbCrO_4$, $SnO_2$, $Fe_3O_4$, ZnO and $WO_3$. In addition, another p type semiconductor comprises, for example, CoO, $Cu_2O$, $MoO_2$, $Cr_2O_3$, SnO, MnO and NiO.

Referring to FIG. 7, the same portions as shown in FIG. 1 are denoted by the same reference characters, and the description thereof are not repeated. Correcting electrodes 14 and 15 are respectively provided between the detecting electrodes 2, 3 and respective end portions of the base member 1 in the longitudinal direction. A direct current variable power supply 16 is connected to the correcting electrodes 14 and 15.

Ideally, the potential distribution between the heating electrodes 4 and the detecting electrodes 2 and 3 is as shown in FIG. 8A, when no fluid flows therethrough. However, when the heating electrodes 4 are not positioned at the center of the base member 1, an offset voltage is generated between the detecting electrodes 2 and 3, in addition to the cases described in association with FIG. 5. In such cases, there are the difference in temperature ($\Delta Ter$) shown in FIG. 8B and the potential difference ($\Delta Ver$) shown in FIG. 8C generated between the detecting electrodes 2 and 3, even if the flow rate is 0.

A voltage for setting off the offset voltage between the detecting electrodes 2 and 3 is applied from the power supply 16. Before the application of the voltage for setting off the offset voltage from the power supply 16, there is the offset voltage ΔVer generated, since there is such a potential distribution as shown by the dotted line in FIG. 8D. After the application of the voltage, the potential distribution becomes as shown by the solid line in FIG. 8D and the potentials at the positions l, and l₂ of the detecting electrodes 2 and 3 become equal to each other. Therefore, an output of a thermoelectromotive force is not produced.

The correcting electrodes 14 and 15 may be respectively provided between the detecting electrodes and respective end surfaces of the base material 1, as shown in FIG. 7. The correcting electrodes 141 and 151 may be provided between the detecting electrodes as shown by the dotted line in FIG. 7. The correcting electrodes may be formed on the surfaces of the base material 1 except the surface on which the detecting electrodes are formed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A thermal-type flow-detecting apparatus, comprising:
   a thermoelectric detecting element having a base member of a ceramic semiconductor and at least one pair of detecting electrodes formed, spaced apart from each other by a distance on said base member, thereby constituting at least one thermoelectric element; and
   heating means for heating a portion of said base member between said one pair of detecting electrodes; said heating means comprising a pair of opposed heating electrodes with the base member interposed therebetween at a portion of said base member between said one pair of detecting electrodes, said heating electrodes being operable as a resistance heater with said base member.

2. The thermal-type flow-detecting apparatus according to claim 1, which further comprises at least one resistor member having one end and the other end;
   said one end of said resistor member being connected to one of said detecting electrodes to obtain an electrical balance between said detecting electrodes, and said other end being connected to a reference voltage.

3. A thermal-type flow-detecting apparatus, comprising a thermoelectric detecting element having a base member of a ceramic semiconductor and at least one pair of detecting electrodes formed, spaced apart from each other by a distance on said base member, thereby constituting at least one thermoelectric element;
   heating means for heating a portion of said base member between said one pair of detecting electrodes; and
   correcting electrodes formed adjacent to each of said detecting electrodes for applying, when an offset potential is generated between said detecting electrodes, a voltage for setting off the potential.

4. An apparatus according to claim 3, comprising a direct current variable power supply connected to said correcting electrodes for supplying said voltage for setting off said offset potential.

5. An apparatus according to claim 3, wherein each of said correcting electrodes is formed between a corresponding detecting electrode and a respective end surface of the base member.

6. An apparatus according to claim 3, wherein said correcting electrodes are formed between said detecting electrodes.

7. A thermal-type flow-detecting apparatus, comprising:
   a base member formed of a plurality of stacked ceramic semiconductor sheets electrically connected with each other in series;
   a pair of detecting electrodes being provided on respective opposing surfaces of said base member;
   a thick film resistor formed on a central portion of said base member with an insulating film interposed therebetween; and
   a power supply for supplying power to said thick film resistor.

8. An apparatus according to claim 7, wherein said thick film resistor is disposed on said base member so as to bridge a plurality of said ceramic semiconductor sheets.

9. An apparatus according to claim 8, wherein said thick film resistor bridges substantially all of said ceramic semiconductor sheets.

10. An apparatus according to claim 7, wherein each of said ceramic conductor sheets is covered by an insulating film except for one end portion of each of said sheets.

11. A thermal-type flow-detecting apparatus, comprising:
    a base member formed of a ceramic semiconductor;
    a plurality of thermoelectric detecting elements formed by a plurality of pairs of detecting electrodes formed on said base member;
    each said thermoelectric detecting element being defined by a pair of said detecting electrodes and said base member;
    interconnecting layers for serially connecting said thermoelectric detecting elements;
    a thick film resistor formed on a central portion of said base member with an insulating film interposed therebetween; and
    a power supply for supplying power to said thick film resistor.

12. An apparatus according to claim 11, wherein said base member has first and second surfaces and said thick film resistor is provided on said first surface of said base member and said plurality of pairs of detecting electrodes and interconnecting layers are provided on said second surface on said base member.

* * * * *